Figure 1:
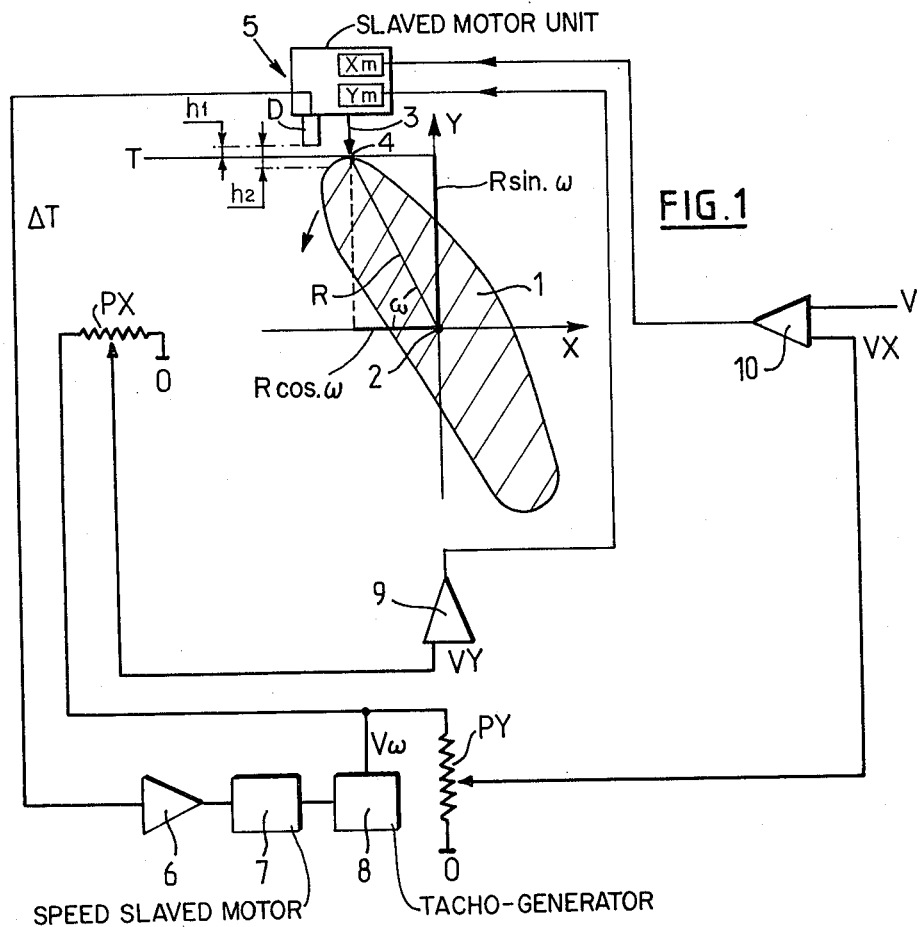

United States Patent [19]

Peiffert et al.

[11] 4,276,503
[45] Jun. 30, 1981

[54] METHOD AND APPARATUS FOR SERVO-CONTROLLING A ROTATING WORKPIECE

[76] Inventors: Jean Peiffert, 42 Allee de Persepolis, Orsay, Essonne; Roger S. Barbedienne, 11, rue de Neuville, Eragny sur Oise, Val d'Oise, both of France

[21] Appl. No.: 944,221

[22] Filed: Sep. 20, 1978

[30] Foreign Application Priority Data

Sep. 20, 1977 [FR] France ................................. 77 28333

[51] Int. Cl.³ ............................................. G05B 19/36
[52] U.S. Cl. .................................... 318/576; 318/578; 318/663
[58] Field of Search ............... 318/578, 571, 663, 576, 318/577

[56] References Cited

U.S. PATENT DOCUMENTS

| | | | |
|---|---|---|---|
| 3,707,662 | 12/1972 | Hoffman | 318/578 |
| 4,084,244 | 4/1978 | Flöter | 318/578 |
| 4,164,694 | 8/1979 | Amsbury | 318/578 |

*Primary Examiner*—B. Dobeck
*Attorney, Agent, or Firm*—Karl W. Flocks

[57] ABSTRACT

Method and device of servo-controlling a rotating workpiece in relation to a member such a tool capable of translational motion along a system of two mutually perpendicular axes as a function of a desired rate of transit of the periphery of said workpiece past said tool, in which a tangent to said periphery is determined and the tool is slaved to the displacement of said tangent parallel to itself, while the angular position of said workpiece is determined and the speed of the tool is varied along its system of axes as a function of said displacement of the tangent. Application to the automatic welding of odd pieces.

3 Claims, 2 Drawing Figures

METHOD AND APPARATUS FOR SERVO-CONTROLLING A ROTATING WORKPIECE

The present invention relates to a method of servo-controlling a rotating workpiece in relation to a member capable of translational motion along two mutually perpendicular axes. The invention is more particularly applicable for servo-controlling the rotation of a workpiece of any geometrical shape which rotates about an axis defining a rotation plane and the contour of which is required to transit past a member capable of two mutually perpendicular translational motions, such as a welding blowpipe. The invention further relates to apparatus for performing the said method.

The Applicants have already described in their copending patent application No. 911,612 filed June 1, 1978, a servo-control method and apparatus applicable to a welding blowpipe and notably enabling the same to be maintained at a constant distance from the edge of a part to be welded. The present invention can be applied to such apparatus in order more particularly to provide a constant rate of transit regardless of the geometrical shape of the edge of the workpiece. For if such part be rotating at constant angular velocity, the peripheral speed can vary in wide proportions relative to a fixed datum. Now it is necessary in many applications to be able to perform an operation calling for a constant rate of transit of the periphery or edge of the workpiece past a tool.

In accordance with this invention, both the rotation speed and the rate of translation of the tool along two perpendicular axes are servo-controlled as a function of a given adjustable relative rate of transit.

Accordingly, a tangent to the workpiece is determined and the tool is disposed along a normal to said tangent, the rotation of the workpiece causing the tangent to be displaced parallel to itself, and the tool is moved along a vector which is the resultant of two vectors respectively parallel to two mutually perpendicular axes along which it is capable of translational motion.

The subject method of this invention accordingly consists in mounting the workpiece on a spindle-which may be horizontal say-driven by rotation powering means themselves dependent on the variation of the tangent relative to the horizontal, detecting said variation and generating a signal representing the same, fixing the angular position of the spindle so as to obtain the horizontal tangent, and varying the translational speed of the tool along its system of perpendicular axes.

There is thereby detected an error signal representing the error relative to the horizontal tangent and this signal is nulled by a rotation of the workpiece resulting in a change of coordinates of the working point of the tool.

Figure 2:
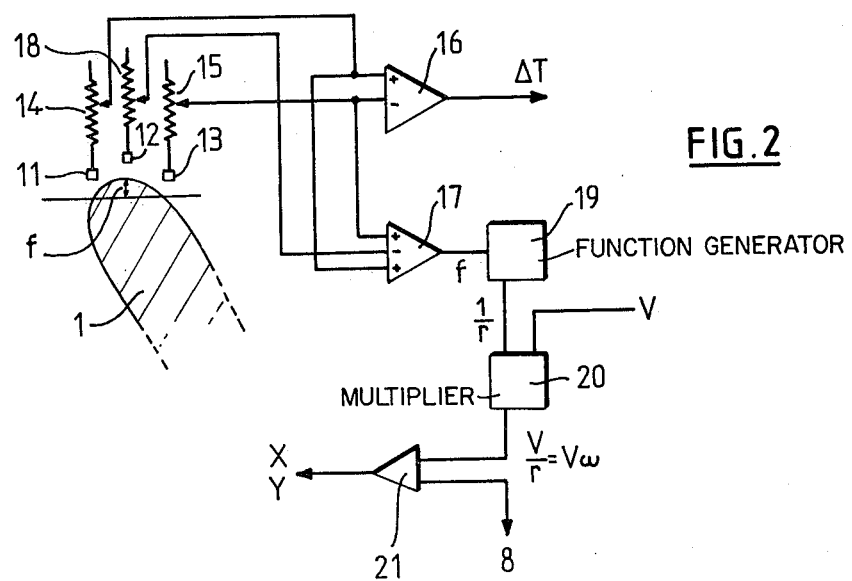

Further particularities and advantages of the invention will become more clearly apparent from the description which follows with reference to the accompanying nonlimitative exemplary drawings in which FIG. 1 is a block diagram of apparatus according to this invention that illustrates the above method in the case of a welding machine and FIG. 2 is a block diagram of an auxiliary corrective circuit for small radii of curvature.

Referring first to FIG. 1, there is shown thereon a metal workpiece 1 of any shape mounted on a rotation spindle 2 disposed horizontally for example. Spindle 2 is associated to a system of coordinates X and Y at whose intersection it lies. A blowpipe 3 is positioned opposite the edge of workpiece 1 and is directed along a line normal to the tangent T at the work point 4 on said workpiece. The location of blowpipe 3 is slaved to the coordinate axes X and Y, parallel to which it is translatable in order to determine motion along a vector which is the resultant of two components respectively parallel to the X and Y axes, which motion is obtained materially through the agency of a slaved-motor unit 5 of any convenient type. Unit 5 as illustrated essentially comprises a detector D associated with blow pipe 3 in the vicinity thereof in the downstream direction, a motor Xm for transit parallel to axis X and a motor Ym for transit parallel to axis Y. Detector D is connected to the input of amplifier 6 while Xm and Ym are respectively connected to the output of amplifiers 10 and 9.

Detector D may be of any convenient type intended to permanently sense its distance from the edge of the workpiece, i.e., from tangent T. If the convenient distance is h1, any different distance h2 will be detected and the difference between h1 and h2 will constitute the output signal of said detector. Said difference is actually representative of the angular error between tangent T and the actual tangent to the edge of the workpiece.

A preferred embodiment of detector D is constituted by a high-frequency antenna (such as 11, 12 in FIG. 2) disclosed in U.S. application No. 911,612 filed June 1, 1978 (U.S. Pat. No. 4,204,146) in the name of the present Applicants. The detector delivers a signal $\Delta T$ representing the error relative to tangent T, which signal is processed in a circuit comprising an amplifier 6 connected to a speed-slaved motor 7 which provides the power for rotating the workpiece and which is itself associated to a tacho-generator 8. Further, the unit 5 for controlling motion of blowpipe 3 is associated to the slides of a system of two potentiometers, to wit PX along the X-axis and PY along the Y-axis—a first terminal of each of which is at zero potential. The other terminals of these potentiometers are interconnected and connected to the output of tacho-generator 8. The potentiometer slides are connected to amplifier control means of the unit 5, to wit amplifier 9 for the Y-axis connected to the slide of potentiometer PX and amplifier 10 for the X-axis connected to the slide of potentiometer PY. Amplifier 10 further includes a second input for an adjustable signal V representing the desired rate of transit of blowpipe 3 and work point 4 describing the edge of workpiece 1.

With such an arrangement, tacho-generator 8 delivers a signal $V\omega$ representing the instantaneous angular velocity of the workpiece about its spindle 2, which signal is applied to the two potentiometers. The blowpipe 3 slaved to the tangent T sets the positions of the two potentiometer slides and the potentiometric ratios thereby determined represent the sine and cosine values of the point 4 with respect to the axes X and Y. The quantity $V\mu$ multiplied by these values gives the respective speeds along the two axes X and Y.

If the output signal from detector D is equal to zero, it means that the edge of workpiece 1 is along tangent T and slave motor 7 does not rotate since no signal is available at the output of amplifier 6. In this configuration, unit 5 will move blow pipe 3 through Xm. With an output signal from detector D, motor 7 is actuated together with Xm and Ym via potentiometer PX and PY.

The slide-contacts of said potentiometers PX and PY are physically connected to blow pipe 3 and they move respectively with the horizontal (x) and vertical (y) transit thereof. The system of two potentiometers of the sine-cosine type constitutes a known divisor giving the two orthogonal components of the angular velocity on the coordinate axis: with an angular velocity $\omega$ and a radius R of workpiece 1, said two components are R sine $\omega$ and R cos $\omega$. The electric value of said components then multiply the value V$\omega$ given by tacho-generator 8 for providing a value of linear velocity of motors Xm and Ym through the respective amplifiers 10 and 9. Thus the velocity of blow pipe 3 will be:

V−V$\omega$ sine $\omega$ along axis X, and V cos $\omega$ along axis Y, V being the predetermined welding velocity which of course is not introduced in the expression of the velocity along axis Y.

Motor 7 is intended to move workpiece 1 in rotation about spindle 2 with an automatically adjusted angular velocity for obtaining the desired rate of transit of blow pipe 3 with respect to the edge of workpiece 1, but 3 also has its own movement for the same purpose. The motion of said blow pipe 3 is effected through two motors included in unit 5 as explained above. For instance, if a straight edge of workpiece 1 disposed along tangent T is to be welded, motor 7 will not allow said workpiece to rotate and only blow pipe 3 will move along said tangent T at the predetermined welding velocity through a motor of unit 5.

The controls of both motor 7 and the two motors in unit 5 are connected within the circuit which constitutes a servo-loop. Motor 7 rotates workpiece 1 at an angular velocity which is inversely proportional to the curvature radius of the edge at the vicinity of the detector included in unit 5 so that the determined welding velocity remains constant. For instance, in the configuration opposed to the preceding one, i.e., on an acute curvature of the edge, motor 7 will rotate workpiece 1 while blow pipe 3 will be substantially immobile. As a result, the welding velocity, i.e., the relative pipe-edge velocity, remains constant and along a tangent which is parallel to axis X.

As shown in FIG. 2, the apparatus hereinbefore described can be supplemented by an auxiliary instantaneous velocity correction circuit which can be particularly useful in the event of very small radii of curvature in relation to the dimensions of the workpiece. For in such cases the percentage error obtained with respect to the velocities along X and Y is multiplied by the ratio of the radius along which the welding point moves about the rotation axis and the radius of curvature of the workpiece.

This corrective circuit includes three radius of curvature arc detectors 11, 12 and 13, each linked to a potentiometer. The slide of first lateral potentiometer 14 is electrically connected to a first input of an operational amplifier 16 delivering the signal $\Delta T$ and of a comparator 17 which outputs a signal representing the rise f of the arc of curvature of part 1. The slide of middle potentiometer 18 is electrically connected to a second input of comparator 17, and the slide of the second lateral potentiometer 15 is electrically connected to the second input of amplifier 16 and to a third input of said comparator. The output of comparator 17 is connected to a function generator 19 which delivers a signal of the form 1/r, where r is the radius of curvature in question. The output of function generator 19 is electrically connected to a multiplier 20 which outputs a signal of the form V/r, that is, which is equal to the true angular velocity V$\omega$. This signal is then applied to a first input of a comparator 21, the other input of which is electrically connected to the output of tacho-generator 8 (FIG. 1) whereby to compare these two data signals and deliver the necessary X and Y correction signals to the control means.

It goes without saying that changes and substitutions may be made in the embodiments of the invention as hereinbefore described without departing from the scope of the invention as set forth in the appended claims.

We claim:

1. A method of servo-controlling a rotating workpiece in relation to a member such as a tool, capable of translational motion along a system of two mutually perpendicular axes, as a function of a desired rate of transit of the periphery of said workpiece past said tool, including the steps of disposing the rotation axis of the workpiece at the centre of the system of axes to which the tool is associated; determining the direction of a tangent to the edge of the workpiece; slaving control over the rotation to displacement of the tangent parallel with itself; detecting such displacement and generating a signal representative thereof; determining the angular position of the workpiece; nulling said signal by rotating the workpiece; and varying the speed of the tool along its system of axes as a function of displacement of the tangent.

2. Apparatus for performing the method as claimed in claim 1, including a speed-slaved motor for rotating the workpiece and speed-slaved means for moving the tool, a system of potentiometers linked to the mutually perpendicular axes and the slides of which are associated to the tool, the slide linked to one axis being electrically connected to a circuit for controlling the tool moving means of the other axis, a detector for detecting displacement of the tangent to the edge of the workpiece and connected to a circuit comprising an amplifier, the slaved rotation controlling motor and a tacho-generator connected to said system of potentiometers, a circuit for controlling movement of the tool along a given axis to which is inputted a signal representing the desired rate of transit.

3. Apparatus as claimed in claim 2, further including a rate of transit correction circuit for small radii of curvature of the workpiece, said circuit including three elements for detecting the arc of the radius of curvature, respectively associated to three potentiometers the slides of which are electrically connected to an amplifier which generates the signal representing displacement of the tangent, and to a comparator which generates the signal representing the rise in the arc and which is connected to a function generator the output from which is applied to a multiplication circuit for multiplication with the desired speed signal, the output from which circuit is applied to a first input of a comparator the second input of which is electrically connected to the output of said tacho-generator, the output from said comparator being applied to the tool moving circuits.

* * * * *